United States Patent
Kim et al.

(10) Patent No.: US 9,814,028 B2
(45) Date of Patent: Nov. 7, 2017

(54) METHOD FOR ALLOCATING UPLINK CONTROL CHANNEL FOR DOWNLINK DATA ACKNOWLEDGEMENT IN WIRELESS COMMUNICATION SYSTEM AND DEVICE THEREFOR

(71) Applicant: LG ELECTRONICS INC., Seoul (KR)

(72) Inventors: Myoungseob Kim, Anyang-si (KR); Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 468 days.

(21) Appl. No.: 14/394,815

(22) PCT Filed: Mar. 14, 2013

(86) PCT No.: PCT/KR2013/002045
§ 371 (c)(1),
(2) Date: Oct. 16, 2014

(87) PCT Pub. No.: WO2013/172543
PCT Pub. Date: Nov. 21, 2013

(65) Prior Publication Data
US 2015/0092692 A1    Apr. 2, 2015

Related U.S. Application Data

(60) Provisional application No. 61/730,942, filed on Nov. 28, 2012, provisional application No. 61/657,886, (Continued)

(51) Int. Cl.
*H04W 72/04* (2009.01)
*H04L 5/00* (2006.01)

(52) U.S. Cl.
CPC ......... *H04W 72/042* (2013.01); *H04L 5/0016* (2013.01); *H04L 5/0037* (2013.01); (Continued)

(58) Field of Classification Search
CPC ............ H04W 72/042; H04W 72/0413; H04L 5/0016; H04L 5/0037; H04L 5/0053; H04L 5/0055; H04L 5/0048
See application file for complete search history.

(56) References Cited

U.S. PATENT DOCUMENTS

| | | | |
|---|---|---|---|
| 2011/0268062 A1* | 11/2011 | Ji | ........................ H04L 5/0055 370/329 |
| 2012/0044890 A1 | 2/2012 | Jen | |
| 2013/0044693 A1* | 2/2013 | Lindh | ................... H04L 5/0026 370/329 |

OTHER PUBLICATIONS

Alcatel-Lucent Shanghai Bell, "DCI Multiplexing for ePDCCH", R1-121253, 3GPP TSG RAN WG1 Meeting #68bis, Jeju, Korea Mar. 26-30, 2012.
(Continued)

*Primary Examiner* — Thai Nguyen
(74) *Attorney, Agent, or Firm* — Dentons US LLP

(57) ABSTRACT

The present invention relates to a method for transmitting a physical uplink control channel (PUCCH) in a wireless communication system and a device therefor. More specifically, the method for transmitting a PUCCH in a wireless communication system comprises the steps of: enabling a terminal to receive an enhanced physical downlink control channel (EPDCCH) having at least one enhanced control channel element (ECCE) from a base station; and transmitting a PUCCH corresponding to a physical data shared channel (PDSCH) scheduled by the EPDCCH to the base station, according to linkage information on the at least one ECCE, wherein the linkage information indicates a resource index of the physical uplink control channel corresponding
(Continued)

to an index of the at least one ECCE according to an aggregation level with respect to the EPDCCH.

10 Claims, 18 Drawing Sheets

Related U.S. Application Data filed on Jun. 10, 2012, provisional application No. 61/648,626, filed on May 18, 2012.

(52) U.S. Cl.
CPC .......... *H04L 5/0048* (2013.01); *H04L 5/0053* (2013.01); *H04L 5/0055* (2013.01); *H04L 5/001* (2013.01); *H04L 5/0046* (2013.01); *H04W 72/0413* (2013.01)

(56) References Cited

OTHER PUBLICATIONS

Alcatel-Lucent Shanghai Bell, "PDCCH resource mapping with ePDCCH", R1-114066, 3GPP TSG RAN WG1 Meeting #67, San Francisco USA Nov. 14-18, 2011.
Asustek, "PDCCH Resource Allocation Corresponding to ePDCCH", R1-121690, 3GPP TSG RAN WG1 Meeting #68bis, Jeju, Korea Mar. 26-30, 2012.

* cited by examiner (a) control-plane protocol stack (b) user-plane protocol stack (a) 1TX or 2TX (b) 4 TX PUCCH format 1a and 1b structure (normal CP case)

METHOD FOR ALLOCATING UPLINK CONTROL CHANNEL FOR DOWNLINK DATA ACKNOWLEDGEMENT IN WIRELESS COMMUNICATION SYSTEM AND DEVICE THEREFOR

This application is a National Stage entry of International Application No. PCT/KR2013/002045, filed on Mar. 14, 2013, which claims priority to U.S. Provisional Application Nos. 61/730,942 filed Nov. 28, 2012; 61/657,886 filed on Jun. 10, 2012; and 61/648,626 filed on May 18, 2012, all of which are incorporated by reference herein in their entirety.

TECHNICAL FIELD

The present invention relates to a wireless communication system, and more particularly, to a method and device for allocating an uplink control channel for downlink data reception acknowledgement.

BACKGROUND ART

A $3^{rd}$ generation partnership project long term evolution (3GPP LTE) communication system will be described as an exemplary wireless communication system to which the present invention can be applied.

FIG. 1 is a schematic view illustrating an evolved universal mobile telecommunications system (E-UMTS) network configuration as an exemplary wireless communication system. E-UMTS is an evolution of the legacy UMTS. E-UMTS is under basic standardization in the 3GPP. In general, it can be said that E-UMTS is an LTE system. For details of the UMTS and E-UMTS technical specifications, refer to Release 7 and Release 8 in "$3^{rd}$ Generation Partnership Project; Technical Specification Group Radio Access Network".

Referring to FIG. 1, the E-UMTS system includes a user equipment (UE), evolved Node Bs (eNode Bs or eNBs), and an access gateway (AG) which is located at an end of the network (E-UTRAN), connected to an external network. An eNode B can simultaneously transmit multiple data streams for broadcast service, multicast service and/or unicast service.

One or more cells are present in a single eNode B. A cell is set to operate in one of the bandwidths of 1.44, 3, 5, 10, 15, and 20 Mhz and provides downlink or uplink transmission service to a plurality of UEs. Different cells may be set to provide different bandwidths. The eNode B controls data transmission and reception to and from a plurality of UEs. Regarding DownLink (DL) data, the eNode B signals information about a time/frequency area, coding scheme, data size, hybrid automatic repeat and request (HARQ) information, etc. for data transmission to a UE by DL scheduling information. Regarding upLink (UL) data, the eNode B signals information about a time/frequency area, coding scheme, data size, hybrid automatic repeat and request (HARM) information, etc. available to the UE by UL scheduling information. An interface for transmitting user traffic or control traffic may be used between eNode Bs. A core network (CN) may be configured with an AG and a network node for performing user registration of a UE. The AG manages the mobility of UEs on a tracking area (TA) basis. A TA is composed of a plurality of cells.

Although wireless communication technology has reached the developmental stage of LTE based on wideband code division multiple access (WCDMA), demands and expectations of users and service providers are ever increasing. Considering that other radio access technologies are being developed, new technological evolutions are required to achieve future competitiveness. There exists a need for reduction of cost per bit, increase of service availability, flexible use of frequency bands, simplified structures and open interfaces, and appropriate power consumption of UEs.

DISCLOSURE

Technical Problem

An object of the present invention devised to solve the problem lies in a method and device for allocating an uplink control channel for downlink data reception acknowledgement in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting an uplink control channel (physical uplink control channel; PUCCH) in a wireless communication system by a user equipment (UE), the method including receiving an enhanced downlink control channel (enhanced physical downlink control channel; EPDCCH) including at least one enhanced control channel element (ECCE), from a base station (BS), and transmitting an uplink control channel (PUCCH) corresponding to a downlink data channel (physical data shared channel; PDSCH) scheduled by the enhanced downlink control channel (EPDCCH) to the BS, according to linkage information about the at least one enhanced control channel element (ECCE), wherein the linkage information indicates a resource index of the uplink control channel corresponding to an index of the at least one enhanced control channel element (ECCE), according to an aggregation level for the enhanced downlink control channel (EPDCCH).

The linkage information may further include information about an aggregation level set used to decode the enhanced downlink control channel (EPDCCH). In addition, an index of a resource for the uplink control channel may be linked with an index of the enhanced control channel element (ECCE) according to a minimum value of an aggregation level included in the aggregation level set.

The method may further include receiving the linkage information from the BS.

The linkage information may be pre-determined according to subframe type.

Resource indexes of the uplink control channel (PUCCH) may be continuously positioned.

A position of a resource index of the uplink control channel (PUCCH) may be determined according to an index of the enhanced control channel element (ECCE) and the aggregation level.

In another aspect of the present invention, provided herein is a user equipment (UE) for transmitting an uplink control channel (physical uplink control channel; PUCCH) in a wireless communication system, the UE including a radio frequency (RF) unit, and a processor, wherein the processor is configured to receive an enhanced downlink control channel (enhanced physical downlink control channel; EPDCCH) including at least one enhanced control channel element (ECCE), from a base station (BS) and to transmit an uplink control channel (PUCCH) corresponding to a downlink data channel (physical data shared channel; PDSCH) scheduled by the enhanced downlink control channel (EPDCCH) to the BS, according to linkage information about the enhanced control channel element (ECCE), wherein the linkage information indicates a resource index of the uplink control channel corresponding to an index of the at least one enhanced control channel element (ECCE), according to an aggregation level for the enhanced downlink control channel (EPDCCH).

Advantageous Effects

According to the present invention, in a method for allocating an uplink control channel for downlink data reception acknowledgement in a wireless communication system, even if configuration of an enhanced physical downlink control channel (EPDCCH) is changed, resources of an uplink control channel corresponding to the changed configuration can be effectively used.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (evolved UMTS), which uses E-UTRA. 3GPP LTE employs OFDMA in downlink and employs SC-FDMA in uplink. LTE-advanced (LTE-A) is an evolved version of 3GPP LTE.

For clarity, the present invention will be described in terms of 3GPP LTE/LTE-A, but is not limited thereto. Specific terms used in the embodiments of the present invention are provided to aid in the understanding of the present invention. These specific terms may be replaced with other terms within the scope and spirit of the present invention.

In a wireless communication system, a user equipment (UE) receives information from a base station (BS) in downlink (DL) and transmits information to the BS in uplink (UL). Information transmitted and received between a UE and a BS includes data and various control information and various physical channels are present according to type/usage of the information transmitted and received between the UE and the BS.

Figure 1:
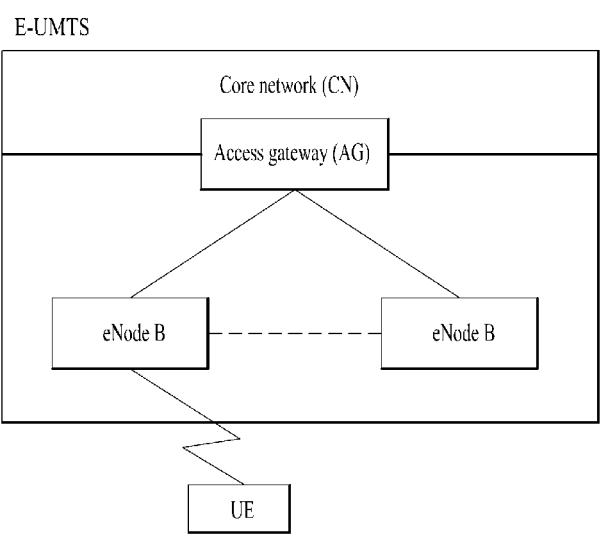
FIG. 1 is a schematic view illustrating an evolved universal mobile telecommunications system (E-UMTS) network configuration as an exemplary wireless communication system.
Figure 2:
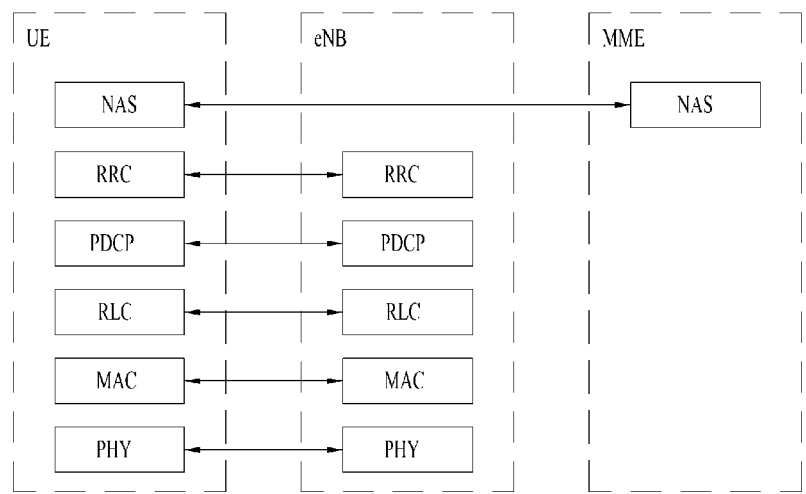
FIG. 2 illustrates a control-plane protocol stack and a user-plane protocol stack in a radio interface protocol architecture between a User Equipment (UE) and an Evolved UMTS Terrestrial Radio Access Network (E-UTRAN), conforming to a $3^{rd}$ Generation Partnership Project (3GPP) wireless access network standard.
Figure 2:
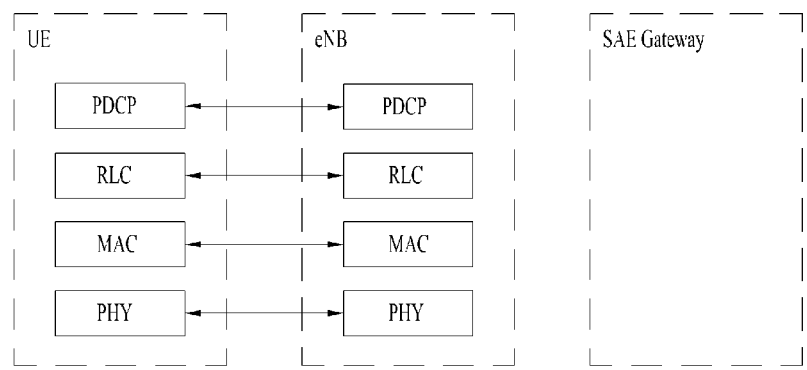

FIG. 2 illustrates a control-plane protocol stack and a user-plane protocol stack in a radio interface protocol architecture between a user equipment (UE) and an evolved UMTS terrestrial radio access network (E-UTRAN), conforming to a 3GPP wireless access network standard. The control plane is a path in which the UE and the E-UTRAN transmit control messages to manage calls, and the user plane is a path in which data generated from an application layer, for example, voice data or Internet packet data is transmitted.

A physical layer at Layer 1 provides information transfer service to its higher layer, medium access control (MAC) layer. The physical layer is connected to the MAC layer via transport channels. The transport channels deliver data between the MAC layer and the physical layer. Data is transmitted on physical channels between the physical layers of a transmitter and a receiver. The physical channels use time and frequency as radio resources. Specifically, the physical channels are modulated in orthogonal frequency division multiple access (OFDMA) for downlink and in single carrier frequency division multiple access (SC-FDMA) for uplink.

The MAC layer at Layer 2 provides service to its higher layer, radio link control (RLC) layer via logical channels. The RLC layer at Layer 2 supports reliable data transmission. The functionality of the RLC layer may be implemented in a function block of the MAC layer. A packet data convergence protocol (PDCP) layer at Layer 2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A radio resource control (RRC) layer at the lowest part of Layer 3 is defined only on the control plane. The RRC layer controls logical channels, transport channels, and physical channels in relation to configuration, reconfiguration, and release of radio bearers (RBs). An RB refers to a service provided at Layer 2, for data transmission between the UE and the E-UTRAN. For this purpose, the RRC layers of the UE and the E-UTRAN exchange RRC messages with each other. If an RRC connection has been established between the RRC layers of the UE and the E-UTRAN, the UE is in RRC connected mode. Otherwise, the UE is in RRC idle mode. A non-access stratum (NAS) layer above the RRC layer performs functions such as session management, mobility management, etc.

A cell covered by an evolved Node B (eNode B or eNB) is set to one of the bandwidths of 1.4, 3, 5, 10, 15, and 20 Mhz and provides downlink or uplink transmission service to a plurality of UEs in the bandwidth. Different cells may be set to different bandwidths.

Downlink transport channels used to deliver data from the E-UTRAN to UEs include a broadcast channel (BCH) carrying system information, a paging channel (PCH) carrying a paging message, and a downlink shared channel (SCH) carrying user traffic or a control message. Downlink multicast or broadcast traffic or control messages may be transmitted on the downlink SCH or a separately defined downlink multicast channel (MCH). Uplink transport channels used to deliver data from a UE to the E-UTRAN include a random access channel (RACH) carrying an initial control message and an uplink SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), and a multicast traffic channel (MTCH).

Figure 3:
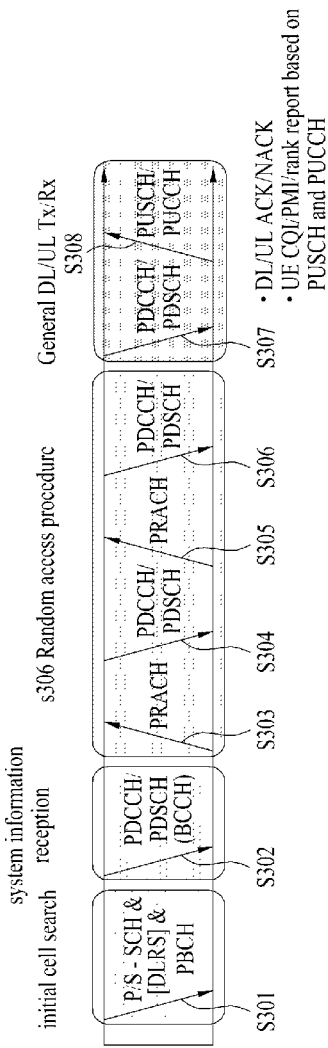
FIG. 3 illustrates physical channels and a general method for transmitting signals on the physical channels in a 3GPP system.

FIG. 3 illustrates physical channels and a general method for transmitting signals on the physical channels in a 3GPP system.

When a UE is powered on or enters a new cell, the UE performs initial cell search (S301). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a downlink channel state by receiving a downlink reference signal (DL RS).

After the initial cell search, the UE may acquire detailed system information by receiving a physical downlink control channel (PDCCH) and receiving a physical downlink shared channel (PDSCH) based on information delivered on the PDCCH (S302).

If the UE initially accesses the eNB or has no radio resources for signal transmission to the eNB, the UE may perform a random access procedure (S303 to S306). In the random access procedure, the UE may transmit a predetermined sequence as a preamble on a physical random access channel (PRACH) (S303 and S305) and may receive a response message to the preamble on a PDCCH and a PDSCH associated with the PDCCH (S304 and S306). In the case of a contention-based random access procedure, the UE may additionally perform a contention resolution procedure.

After the above procedure, the UE may receive a PDCCH and/or a PDSCH from the eNB (S307) and transmit a physical uplink shared channel (PUSCH) and/or a physical uplink control channel (PUCCH) to the eNB (S308), which is a general downlink and uplink signal transmission procedure. Particularly, the UE receives downlink control information (DCI) on the PDCCH. The DCI includes control information such as resource allocation information for the UE. The DCI has a different format depending on its usage. Control information transmitted to a BS from a UE is collectively referred to as uplink control information (UCI). The UCI includes hybrid automatic repeat and request acknowledgement/negative-ACK (HARQ ACK/NACK), scheduling request (SR), channel state information (CSI), etc. Through this specification, HARQ ACK/NACK is simply referred to as HARQ-ACK or ACK/NACK(A/N). The HARQ-ACK includes at least one of positive ACK (simply, ACK), negative ACK (NACK), DTX, and NACK/DTX. The CSI includes channel quality indicator (CQI), precoding matrix indicator (PMI), rank indicator (RI), etc. In general, the UCI may be transmitted through PUCCH, but may be transmitted through PUSCH when control information and traffic data are simultaneously transmitted. In addition, UCI may be aperiodically transmitted through PUSCH according to request/order of a network.

Figure 4:
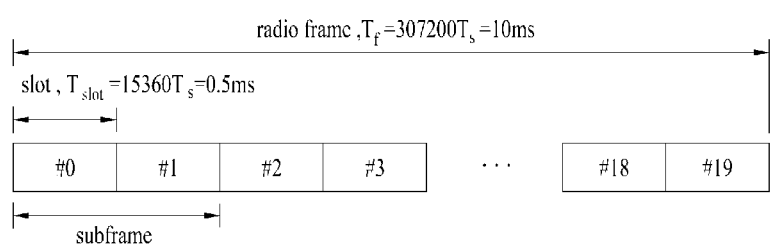
FIG. 4 illustrates an exemplary radio frame structure in a long term evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ \text{kHz} \times 2048)=3.2552 \times 10^{-8}$ (about 33 ns). A slot includes a plurality of OFDM symbols or SC-FDMA symbols in the time domain by a plurality of resource blocks (RBs) in the frequency domain. In the LTE system, one RB includes 12 subcarriers by 7 (or 6) OFDM symbols. A unit time in which data is transmitted is defined as transmission time interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
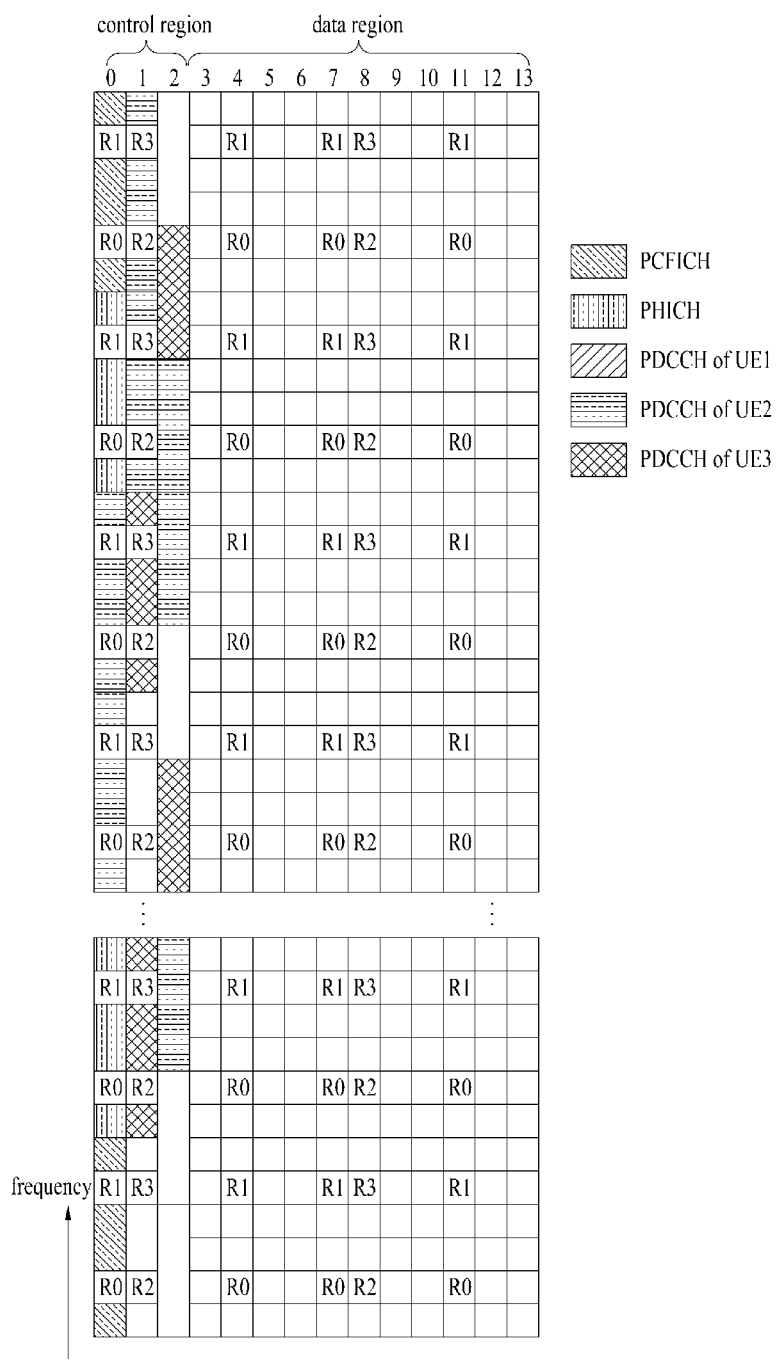
FIG. 5 illustrates an exemplary control channel included in a control region of a subframe in a downlink radio frame.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a spreading factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
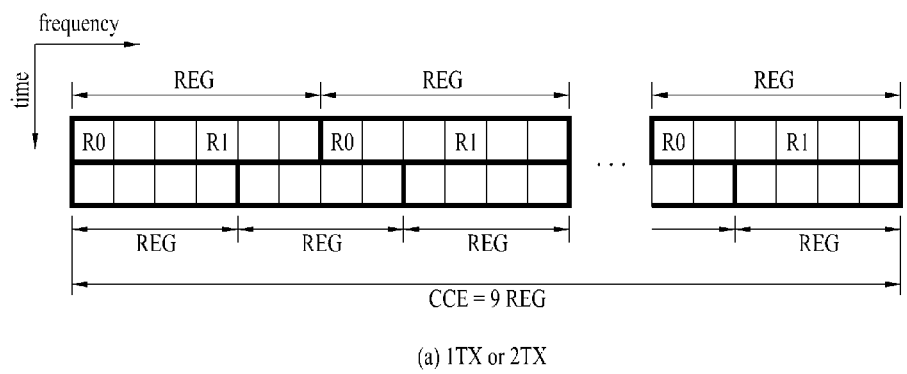
FIG. 6 illustrates resource units used to configure a control channel.
Figure 6:
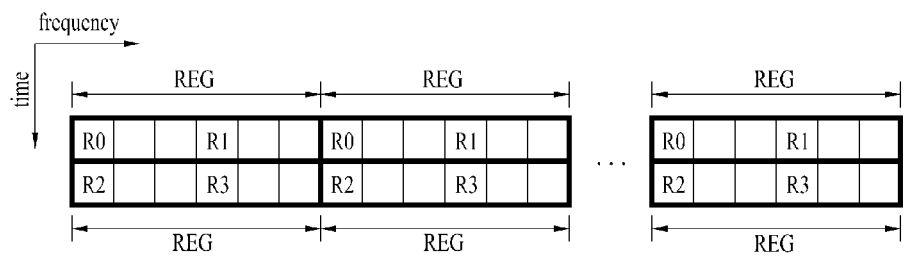

FIG. 6 illustrates resource units used to configure a control channel. Specifically, FIG. 6(a) illustrates resource units used to configure a control channel, when the number of transmission (Tx) antennas in an eNB is 1 or 2 and FIG. 6(b) illustrates resource units used to configure a control channel, when the number of Tx antennas in an eNB is 4. Although a different reference signal (RS) pattern is used according to the number of Tx antennas, resources unit related to a control channel are configured in the same manner.

Referring to FIGS. 6(a) and 6(b), a basic resource unit of a control channel is an REG. An REG includes 4 contiguous resource elements (REs) except for REs used for RSs. A bold square represents an REG in FIG. 6. A PCFICH and a PHICH include 4 REGs and 3 REGs, respectively. A PDCCH is composed of control channel elements (CCE), each CCE including 9 REGs.

A UE is configured to check CCEs that are arranged continuously or according to a specific rule in order to check whether a PDCCH including L CCEs is transmitted to the UE. The UE needs to consider a plurality of L values for PDCCH reception. CCE sets that need to be checked by the UE for PDCCH reception is referred to as a search space.

Search spaces may be classified into a UE-specific search space accessible only to a specific UE and a common search space accessible to all UEs. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

Figure 7:
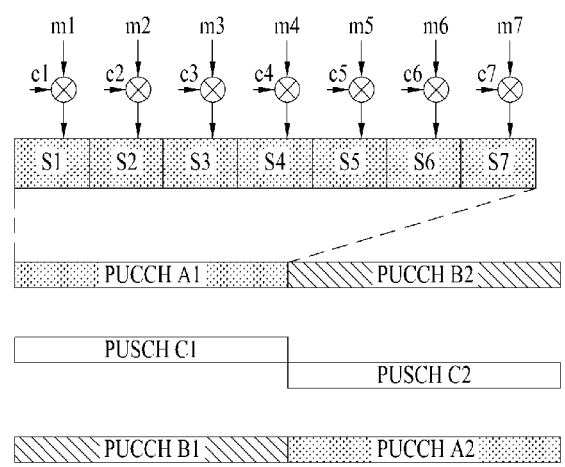
FIG. 7 illustrates an exemplary uplink subframe structure in the LTE system.

FIG. 7 illustrates an exemplary uplink subframe structure in the LTE system.

Referring to FIG. 7, an uplink subframe includes a plurality of (e.g. 2) slots. A slot may include a different number of SC-FDMA symbols according to CP length. For example, a slot may include 7 SC-FDMA symbols in the case of a normal CP. The uplink subframe is divided into a data region and a control region. A PUSCH signal is transmitted and received in the data region. The data region is also used to transmit a UL data signal such as a voice signal. A PUCCH signal is transmitted and received in the control region. The control region is also used to transmit UL control information. The PUCCH includes an RB pair (e.g. m=0, 1, 2 and 3) at both ends of the data region on the frequency axis and hops over a slot boundary. The control information includes ACK/NACK, CQI, PMI, RI, etc. In addition, the PUSCH and the PUCCH are not simultaneously transmitted. Table 1 below shows the characteristics of PUCCH format stated in 3GPP TS 36.211 Release-11.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |

TABLE 1-continued

| PUCCH format | Modulation scheme | Number of bits per subframe, $M_{bit}$ |
|---|---|---|
| 2a | QPSK + BPSK | 21 |
| 2b | QPSK + QPSK | 22 |
| 3 | QPSK | 48 |

Figure 8:
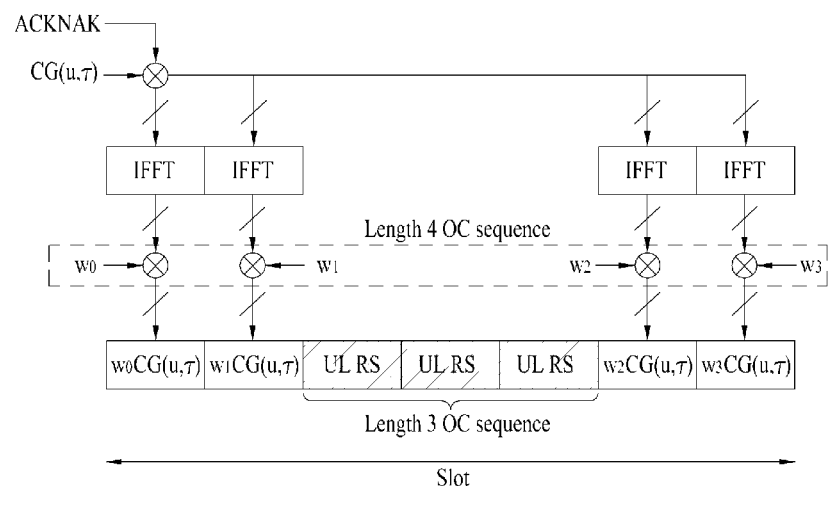
FIG. 8 is a diagram illustrating a structure of a PUCCH for transmission of ACK/NACK.

FIG. 8 is a diagram illustrating a structure of a PUCCH for transmission of ACK/NACK.

Referring to FIG. 8, in the case of a normal CP, three continuous symbols positioned in an intermediate portion of a slot carry a reference signal (UL RS) and the remaining four slots carry control information (that is, ACK/NACK). In the case of an extended CP, a slot includes 6 symbols and third and fourth symbols carry a reference signal. ACK/NACK from a plurality of UEs is multiplexed for one PUCCH resource using a CDM method. The CDM method is embodied using cyclic shift (CS) of a sequence for frequency diversity and/or an orthogonal cover sequence for time diversity. For example, ACK/NACK is distinguished using different cyclic shifts (CS s) (frequency diversity) of a computer generated constant amplitude zero auto correlation (CG-CAZAC) sequence and/or different Walsh/DFT orthogonal cover sequences (time diversity). w0, w1, w2, and w3 that are multiplied after IFFT have the same result even if being multiplied before IFFT. In the LTE system, PUCCH resources for transmission of ACK/NACK is represented by a combination of a position of frequency-time resources (e.g., resource block), CS of sequence of frequency diversity, and an orthogonal cover sequence for time diversity, and each PUCCH resource is indicated using a PUCCH (resource) index.

Figure 9:
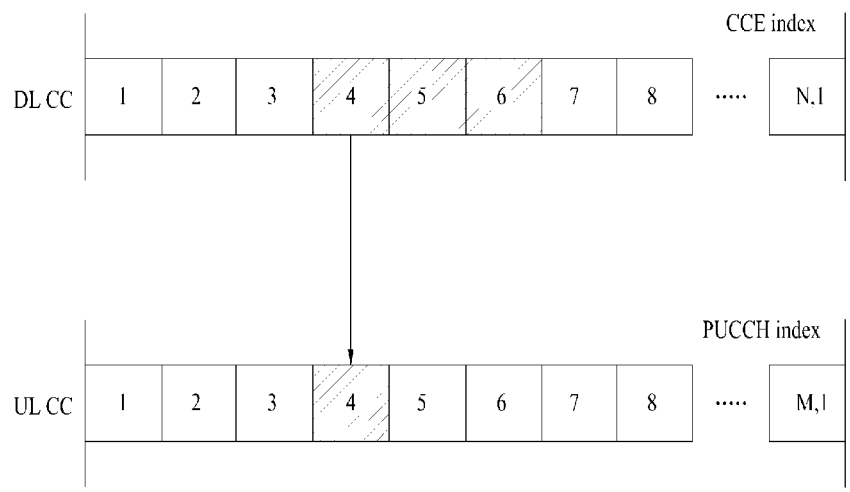
FIG. 9 illustrates an example of determining PUCCH resources for ACK/NACK.

FIG. 9 illustrates an example of determining PUCCH resources for ACK/NACK. In an LTE system, a plurality of PUCCH resources for ACK/NACK are shared by a plurality of UEs in a cell every time the UEs need the PUCCH resources rather than being allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured by a plurality of control channel elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 9, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 9, a UE transmits an ACK/NACK signal on PUCCH #4 corresponding to CCE #4, the first CCE of the PDCCH. FIG. 6 illustrates a case in which maximum M PUCCHs are present in the UL CC when maximum N CCEs exist in the DL CC. Though N can equal M, N may differ from M and CCEs are mapped to PUCCHs in an overlapping manner.

Specifically, a PUCCH resource index in an LTE system is determined as follows.

$$n^{(1)}\text{PUCCH} = n\text{CCE} + N^{(1)}\text{PUCCH} \quad \text{[Equation 1]}$$

Here, $n^{(1)}$PUCCH represents a resource index of ACK/NACK transmission and $N^{(1)}$PUCCH denotes a signaling value received from a higher layer, and nCCE denotes the smallest value of CCE indexes used for PDCCH transmission.

In a current wireless communication environment, with emergence and dissemination of various devices requiring machine-to-machine (M2M) communication and high data transfer rate, data requirements of a cellular network are growing very quickly. To satisfy high data requirements, carrier aggregation technology for efficiently using a larger frequency band, multi antenna technology for increasing data capacity within a restricted frequency, multi base-station coordinated technology, etc. have been developed as communication technology and a communication environment is evolved to increase the density of nodes which can be accessed by users. Coordination between nodes may improve system performance of a system with such a high density of nodes. In such a system, each node operates as an independent base station (BS), an advanced BS (ABS), a node B (NB), an eNodeB (eNB), an access point (AP), etc. and has far superior performance to a non-coordinated system.

Figure 10:
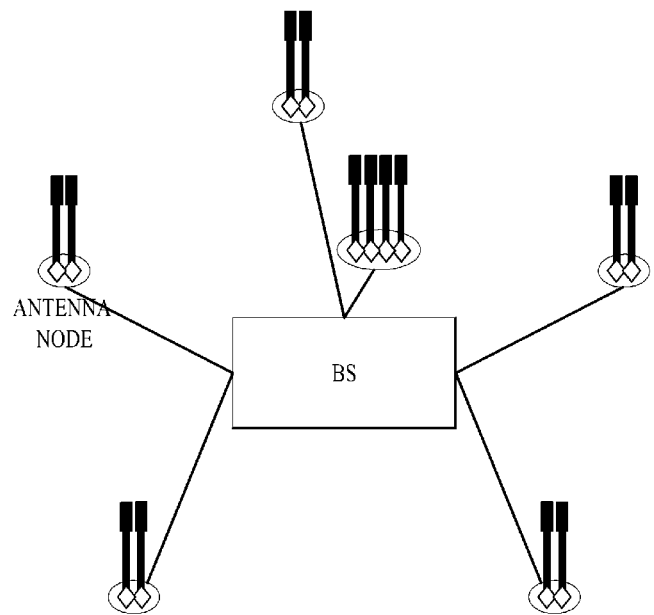
FIG. 10 is a diagram showing a multi-node system in a next-generation communication system.

FIG. 10 is a diagram showing a multi-node system in a next-generation communication system.

Referring to FIG. 10, if transmission and reception of all nodes are managed by one controller such that the individual nodes operate as parts of an antenna group of one cell, this system may be regarded as a distributed multi node system (DMNS) forming one cell. At this time, the individual nodes may be assigned separate node IDs or may operate as some antennas of a cell without a separate node ID. However, a system including nodes having different cell identifiers (IDs) may be a multi cell system. If multiple cells are configured to overlap according to coverage, this is called a multi-tier network.

A NodeB, an eNodeB, a PeNB, a HeNB, a remote radio head (RRH), a relay, a distributed antenna, etc. may become a node and at least one antenna is mounted per node. The node is also called a transmission point. Although the node generally refers to a group of antennas separated at a predetermined spacing or more, the present invention is applicable to an arbitrary group of nodes defined regardless of spacing.

Due to introduction of the above-described multi node system and relay node, various communication schemes are applicable to improve channel quality. However, in order to apply the MIMO scheme and an inter-cell communication scheme to a multi node environment, a new control channel is required. Accordingly, an enhanced-physical downlink control channel (EPDCCH) is being discussed as a newly introduced control channel and is allocated to a data region (hereinafter, referred to as a PDSCH region), not to an existing control region, (hereinafter, referred to as a PDCCH region).

In conclusion, control information of a node can be transmitted to each UE via such an EPDCCH so as to solve a problem that an existing PDCCH region is insufficient. For reference, the EPDCCH may not be transmitted to a legacy UE but may be transmitted to an LTE-A UE only.

Figure 11:
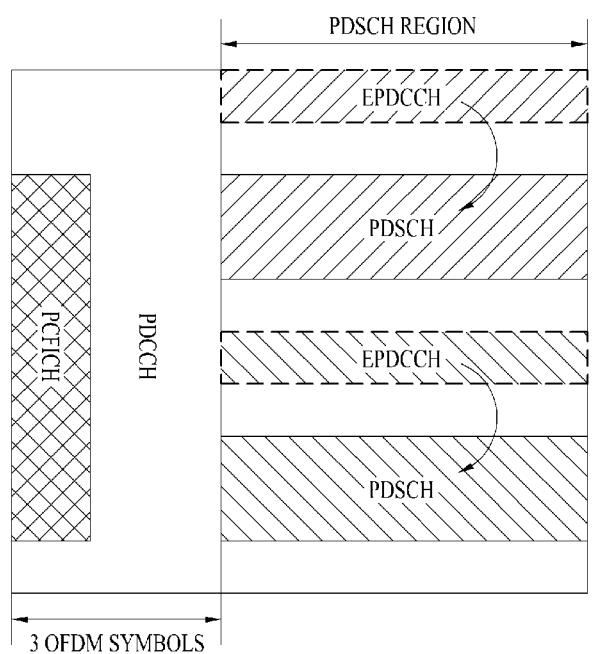
FIG. 11 is a diagram showing an EPDCCH and a PDSCH scheduled by the EPDCCH.

FIG. 11 is a diagram showing an EPDCCH and a PDSCH scheduled by the EPDCCH.

Referring to FIG. 11, the EPDCCH may be generally transmitted via a PDSCH region for transmitting data. A UE should perform a blind decoding process of a search space for the EPDCCH in order to detect presence/absence of the EPDCCH thereof. The EPDCCH performs the same scheduling operation (that is, PDSCH or PUSCH control) as the existing PDCCH. However, if the number of UEs accessing a node such as an RRH is increased, a larger number of EPDCCHs are allocated to a PDSCH region, thereby increasing the number of times of blind decoding to be performed by the UE and increasing complexity.

Here, physical control information transmitted through a PDSCH resource region shown in FIG. 11 is defined as EPDCCH in the present invention. In this case, the aforementioned proposed methods can also be applied to the case in which ACK/NACK information linked with an EPDCCH is transmitted through an (e)PUCCH resource region or newly (independently) defined PUCCH, not a PUCCH resource linked with a legacy PDCCH. However, although the detailed description of the present invention will be given in terms of (e)PUCCH for convenience of description, the present invention may be applied to a newly defined PDSCH.

That is, as described above, a PUCCH resource used for ACK/NAK in uplink is determined in association with a resource of a control channel element (CCE) included in a downlink PDCCH. Accordingly, the present invention proposes a linkage method between a resource for a PUCCH or an (e)PUCCH and an enhanced control channel element (ECCE) by extensively applying the above method. In this specification, for convenience of description, although the present invention has been described in terms of ACK/NACK for a PDSCH scheduled by an (E)PDCCH, the present invention can also be applied to the case in which ACK/NACK for (E)PDCCH is allocated directly to a PUCCH resource.

Figure 12:
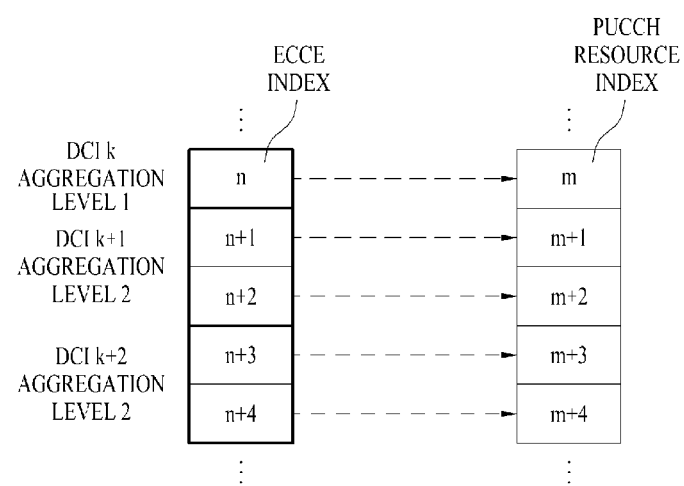
FIG. 12 is a reference diagram for explanation of linkage between a resource of a PUCCH and an enhanced control channel element (ECCE)

FIG. 12 is a reference diagram for explanation of linkage between a resource of a PUCCH and an enhanced control channel element (ECCE).

Referring to FIG. 12, one DCI may be configured by aggregating one or more ECCEs. Accordingly, configuration of an EPDCCH for transmission of the DCI may be dynamically changed. Thus, assuming that an aggregation level of all DCIs is 1, a resource for a PUCCH may be configured to reserve one PUCCH resource per ECCE.

However, the number of ECCEs included in one pair of PRBs of the EPDCCH may be randomly configured. For example, the number of ECCEs may be one or plural. In addition, with respect to a plurality of subframes, the number of ECCEs may be fixed or different for each subframe.

Accordingly, when the number of resource elements (REs) that can be used in one subframe is very small according to a subframe configuration, the number of REs included in one ECCE may not be sufficient. For example, since the number of REs that can be used in a subframe is small, when the number of ECCEs included in at least one PRB pair is fixed as a small number, only one ECCE cannot satisfy a minimum code rate required by one DCI message, and thus only UEs present in partial coverage around a BS can receive the message. Accordingly, according to a subframe, the subframe may be configured to aggregate a plurality of ECCEs and use one DCI. In this case, there is the possibility that a low aggregation level such as aggregation level 1 is not used.

Figure 13:
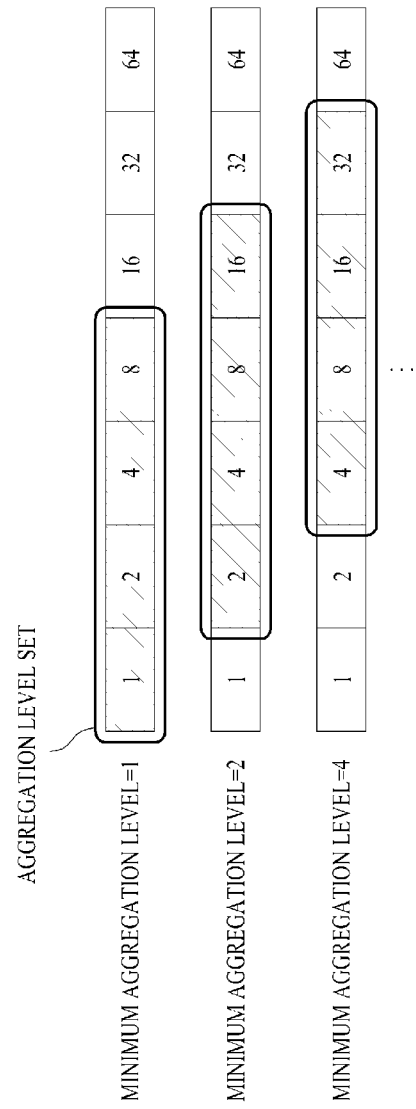
FIG. 13 illustrates a method of changing an aggregation level set according to a minimum aggregation level.

FIG. 13 illustrates a method of changing an aggregation level set according to a minimum aggregation level.

Referring to FIG. 13, when an aggregation level set is {1, 2, 4, 8} or a minimum aggregation level required in a zero specific subframe is 2, an aggregation level set may be changed such that {2, 4, 8, 16} is used. In addition, when a subframe configuration is changed and a minimum aggregation level required in the corresponding subframe is configured as 4, an aggregation level set may be re-changed and an aggregation level set configured as {4, 8, 16, 32} may be used in order to adjust a required code rate and ensure coverage performance.

In this case, when an aggregation level is elevated (e.g., from 1 to 2), if one PUCCH resource per ECCE is linked like in PUCCH resource linkage condition shown in FIG. 12, a problem may arise in that unnecessary PUCCH resources are reserved.

Accordingly, the present invention proposes a method of variably performing a PUCCH resource allocation method based on an aggregation level set that is changed according to a subframe configuration, etc.

In the present invention, a BS may explicitly signal configuration for an aggregation level set to a UE via higher layer signaling, physical layer control/data channel, etc. Alternatively, the UE may implicitly recognize the configuration for the aggregation level set according to a reference signal, and subframe type (e.g., a special subframe, an MBSFN subframe, etc.) configuration according to a predetermined rule.

Figure 14:
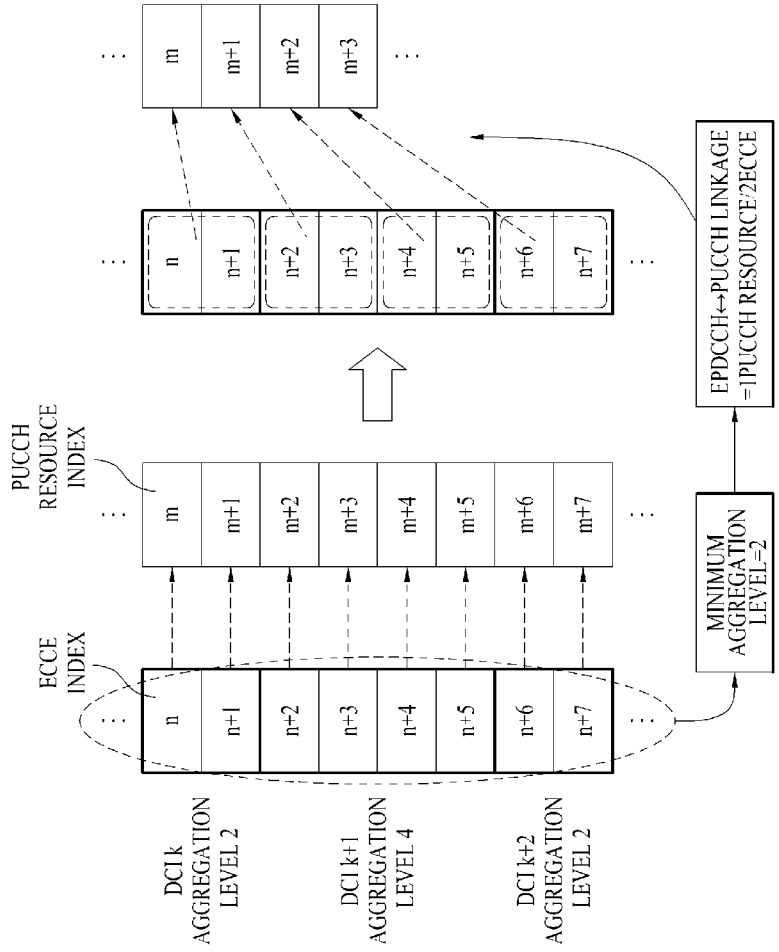
FIG. 14 illustrates a PUCCH resource allocation method according to an aggregation level according to the present invention.

FIG. 14 illustrates a PUCCH resource allocation method according to an aggregation level according to the present invention. Referring to FIG. 14, the present invention proposes a method of reserving PUCCH resources according to a used aggregation level set.

According to an embodiment of the present invention, at least one corresponding ECCE according to a minimum value of an aggregation level set is reserved for a representative PUCCH resource. For example, as illustrated in FIG. 14, when a minimum value of an aggregation level set is 2, the same PUCCH resources are reserved for two ECCEs. That is, as shown in FIG. 14, an aggregation level set that is changed in subframe units, and a PUCCH resource and index corresponding thereto may be variably allocated.

When offset of a PUCCH resource index in which ACK/NAK information for an ECCE is begun to be allocated is $m_0$, an index of ECCE is n, and a minimum aggregation level is $\min_{agg}$, a PUCCH resource index corresponding to each ECCE may be defined according to Equation 2 below.

$$PUCCH \text{ resource index} = m_0 + \text{floor}\left(\frac{n}{\min_{agg}}\right) \quad \text{[Equation 2]}$$

Alternatively, a linkage correlation between a PUCCH or (e)PUCCH resource index and an ECCE index included in an EPDCCH may be differently pre-configured according to a minimum value of an aggregation level set that is changed according to configuration of subframe type (e.g., a special subframe, an MBSFN subframe, etc.). Similarly, the linkage correlation between a PUCCH or (e)PUCCH resource index and an ECCE index may be differently defined according to reference signal configuration. In addition, an EPDCCH type (e.g., a localized or distributed type) may be considered to determine a minimum aggregation level.

Figure 15:
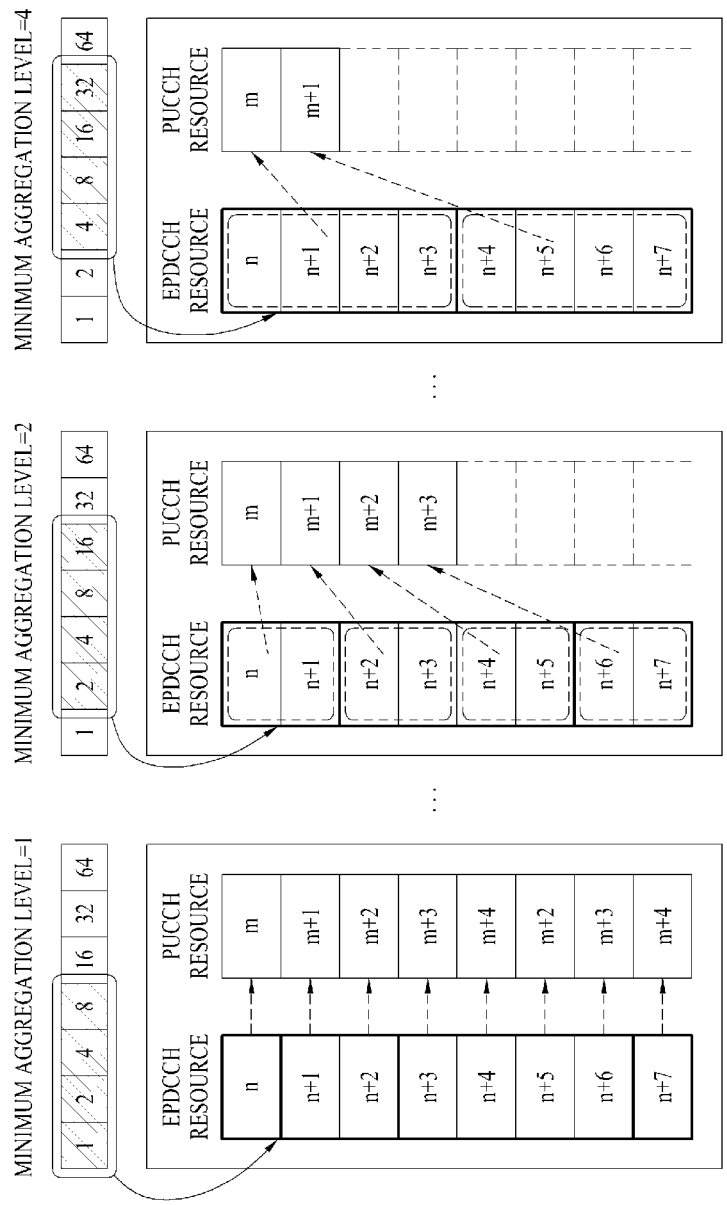
FIG. 15 illustrates an aggregation level set determined according to subframe configuration and a method for allocating PUCCH or (e)PUCCH resource corresponding to the aggregation level set.

FIG. 15 illustrates an aggregation level set determined according to subframe configuration by applying the rule defined in Equation 2 above and a method for allocating PUCCH or (e)PUCCH resource according to the aggregation level set.

That is, when a minimum aggregation level is 1, an EPDCCH index n is increased by 1, and thus, PUCCH resource index m is also increased by 1. However, when a minimum aggregation level is 2 or 4, even if an EPDCCH index is increased, a PUCCH resource index is increased based on the minimum aggregation level.

Figure 16:
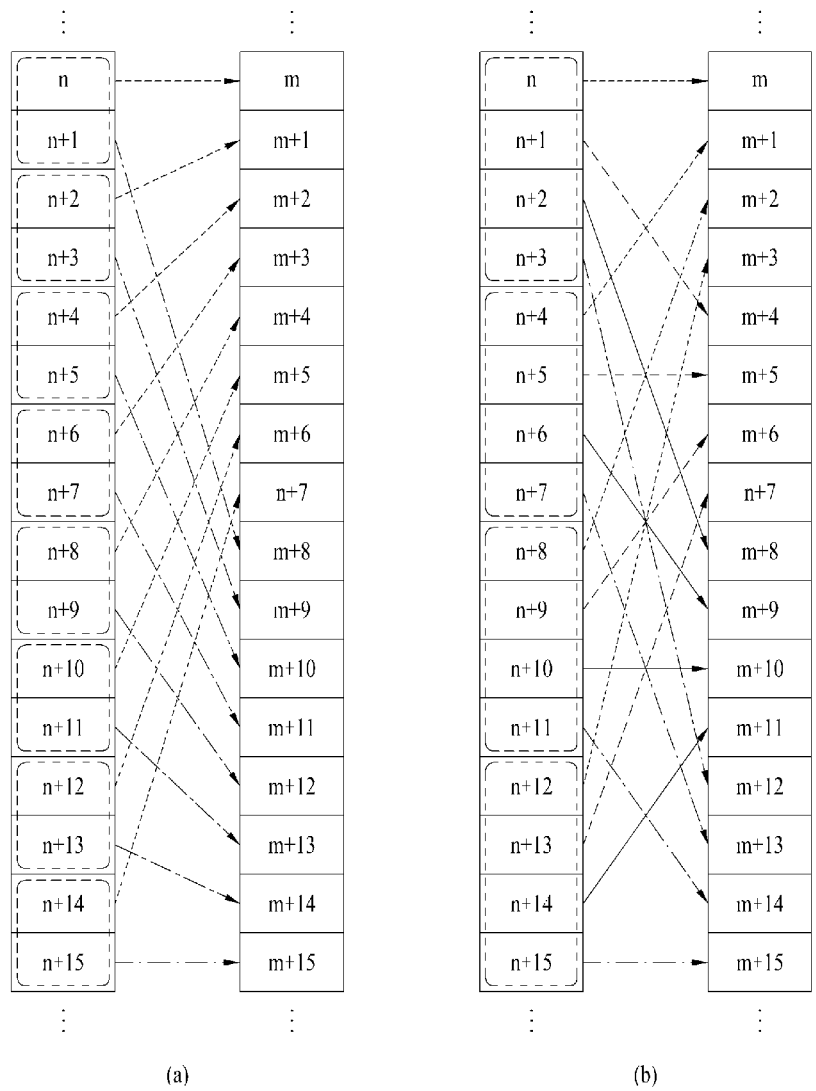
FIG. 16 illustrates definition of a linkage correlation between a PUCCH or (e)PUCCH resource index and an ECCE index according to an embodiment of the present invention.

FIG. 16 illustrates definition of a linkage correlation between a PUCCH or (e)PUCCH resource index and an ECCE index according to an embodiment of the present invention.

Referring to FIG. 16, in order to explain a linkage correlation between (e)PUCCH resource index and an ECCE index included in an EPDCCH, the ECCE index is defined as n and the (e)PUCCH resource index is defined as m.

FIG. 16(a) defines a method for preferentially linking ECCE indexes (e.g., n, n+2, ... ), "ECCE index modulo 2" of which satisfies 0 among a plurality of ECCEs included in an EPDCCH with an (e)PUCCH resource index and then linking a plurality of ECCE indexes, "ECCE index modulo 2" of which satisfies 1 with the remaining (e)PUCCH resource indexes. That is, FIG. 16(a) illustrates a method for linking an ECCE index corresponding to an even number with an (e)PUCCH resource index in ascending order and then linking an ECCE index corresponding to an odd number with an (e)PUCCH resource index in ascending order. The method can be effectively used when a minimum aggregation level is configured as 2 (e.g., aggregation level set {2, 4, 8, 16}). In addition, the method can also be applied in order to effectively use (e)PUCCH resource when a minimum aggregation level is configured as another value except for 2 (e.g., 4 and 8).

Similarly, FIG. 16(b) illustrates a method for preferentially linking one or more ECCE indexes (e.g., n, n+4, ... ), "ECCE index modulo 4" of which satisfies 0 with an (e)PUCCH resource index and then sequentially linking one or more ECCE indexes (e.g., n+1, n+5, ... ), "ECCE index modulo 4" of which satisfies 1, one or more ECCE indexes (e.g., n+2, n+6, ... ), "ECCE index modulo 4" of which satisfies 2, and one or more ECCE indexes (e.g., n+3, n+7, ... ), "ECCE index modulo 4" of which satisfies 3, with the remaining (e)PUCCH resource indexes. The method of FIG. 16(b) can be effectively used when a minimum aggregation level is configured as 4 (e.g., aggregation level set {4, 8, 16, 32}). In addition, the method can also be applied when a minimum aggregation level is configured as another value except for 4 (e.g., 8).

As shown in FIG. 16, an ECCE index and an (e)PUCCH resource index may be linked with each other according to a minimum aggregation level. According to the present invention, assuming that an ECCE index is n and minimum aggregation level configuration is $min_{agg}$, indexes, "n modulo $min_{agg}$" of which satisfies 0, are preferentially linked with an (e)PUCCH resource index and then indexes, "n modulo $min_{agg}$" of which satisfies k, are sequentially linked with the remaining (e)PUCCH resource indexes (k is an integer, k>0, k=1, 2, ... ). That is, when $min_{agg}$ is configured as 2, the method of FIG. 16(a) can be applied, and when $min_{agg}$ is configured as 4, the method of 16(b) can be applied.

According to an embodiment of the present invention, a BS may explicitly signal information about a linkage correlation between a PUCCH or (e)PUCCH resource index and an ECCE index included in an EPDCCH to a UE via higher layer signaling, physical layer control/data channel, etc. Alternatively, the UE may implicitly recognize the information according to a reference signal, and subframe type (e.g., a special subframe, an MBSFN subframe, etc.) configuration according to a predetermined rule.

In addition, according to an embodiment of the present invention, a linkage correlation between a PUCCH or (e)PUCCH resource index and an ECCE index included in an EPDCCH may be defined in ascending order or defined in descending order as necessary.

Although the embodiment of the present invention illustrated in FIG. 16 has been described in terms of the case in which a minimum aggregation level is changed to 1 or 2 as shown in FIG. 16(a) or the case in which a minimum aggregation level is changed to 1 or 4 as shown in FIG. 16(b), the present invention can also be extensively applied to the case in which a minimum aggregation level is changed in multiple steps.

Figure 17:
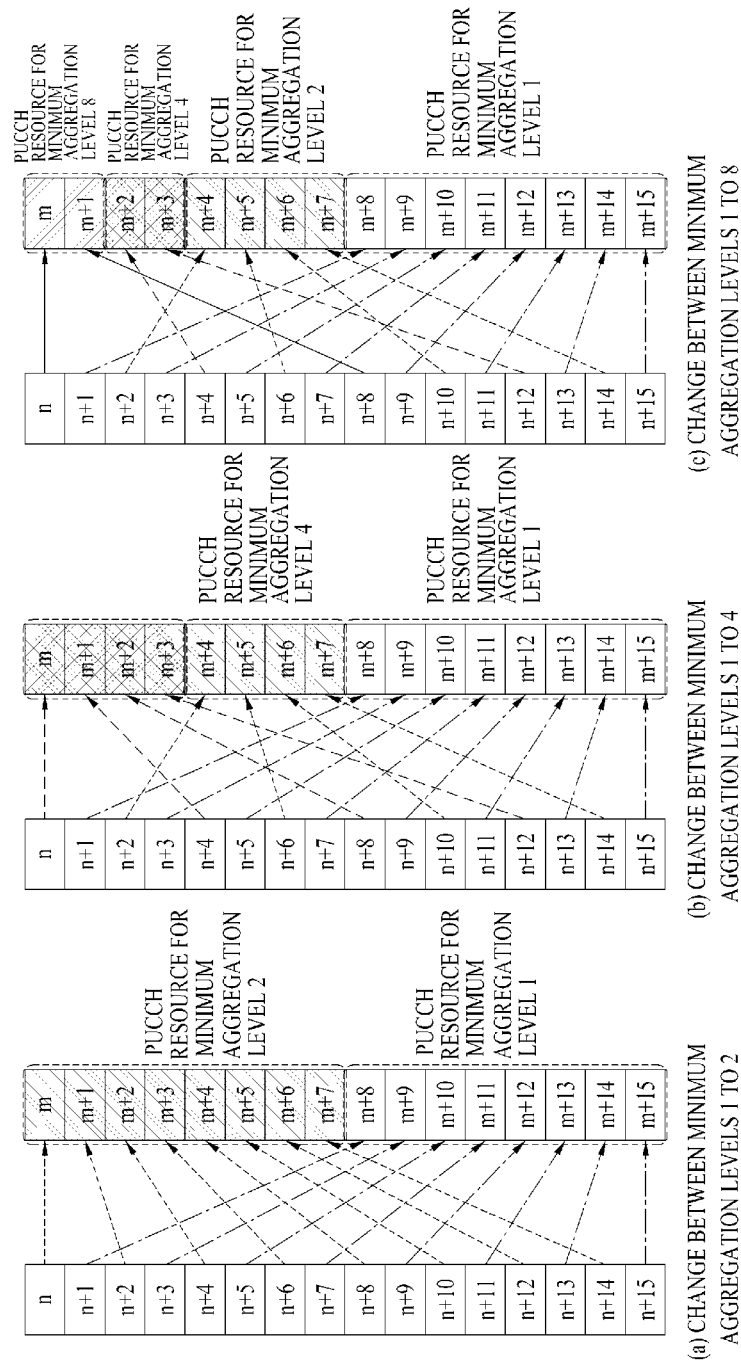
FIG. 17 illustrates an embodiment obtained by extensively applying the present invention in order to apply an ECCE index and a PUCCH resource index to the case in which a minimum aggregation index is changed in multi steps.

FIG. 17 illustrates an embodiment obtained by extensively applying the present invention in order to apply an ECCE index and a PUCCH resource index to the case in which a minimum aggregation index is changed in multiple steps.

According to the present invention, a specific DCI message may include one or more ECCEs. Accordingly, among one or more ECCEs included in the DCI message, it may be assumed that an ECCE with a smallest ECCE index is configured as a representative ECCE. In this case, a method for linking a representative ECCE and a PUCCH resource index can be applied.

That is, when ECCE#(n+1) is selected as a representative ECCE, this does not necessarily mean that an aggregation level of corresponding DCI is 1 but means that a minimum aggregation level of a corresponding EPDCCH set is 1. According to the present invention, a PUCCH resource index linked with a corresponding EPDCCH set may be configured for a lower half region of a PUCCH resource region. Here, the lower half region of the PUCCH resource region refers to a region including PUCCH resource with a largest index to PUCCH resource corresponding to the top 50% of largest indexes. Similarly, an upper half region of the PUCCH resource region refers to a region including PUCCH resource corresponding top 50% of largest indexes to PUCCH resource corresponding to a lowest index. That is, when a minimum aggregation level is equal or greater than 2, the upper half region of the PUCCH resource region can be used.

Similarly, when ECCE #(n+3), ECCE #(n+5), ... etc. are selected as a representative ECCE, this does not necessarily mean that an aggregation level of corresponding DCI is 1 but means that a minimum aggregation level of a corresponding EPDCCH set is 1. Accordingly, like in the case of ECCE #(n+1), PUCCH resource for ECCE having an index that satisfies "(ECCE index–$n_{offset}$) modulo 2=1", such as ECCE #(n+3), ECCE #(n+5), ... may also be configured for a lower half region of a PUCCH resource region. (Here, $n_{offset}$ may be a minimum ECCE index of a corresponding EPDCCH set and may be defined as offset for ECCE.)

FIGS. 17(a) to 17(c) illustrate an example of a rule for sequentially linking PUCCH resource indexes linked with ECCE resources having a corresponding index based on a lower half region of a PUCCH resource region. Although FIGS. 17(a) to 17(c) illustrate an embodiment for linking PUCCH resource indexes in ascending order, it is obvious that the present invention can be applied to the case in which PUCCH resource indexes are applied in descending order.

Similarly, when ECCE #(n+2) is selected as a representative ECCE, this does not necessarily mean that an aggregation level of corresponding DCI is 2 but means that a minimum aggregation level of a corresponding EPDCCH set is 1 or 2. Accordingly, a PUCCH resource index linked with the corresponding representative ECCE may be configured in the remaining region (an upper half region of an entire PUCCH resource region) of the linked PUCCH resource prepared when an aggregation level is 1. In addition, a PUCCH resource region when a minimum aggregation level is 2 does not have to be linked from a start index of a PUCCH resource region, and a predetermined region (e.g., a first ¼ region of the entire PUCCH resource region) of the PUCCH resource region may be configured as a PUCCH resource region prepared for the case of different minimum aggregation levels (e.g., a minimum aggregation level is 4 or more). That is, PUCCH resources prepared when a minimum aggregation level is 2 may be positioned between points ¼ to ½ of the PUCCH resource region except for the PUCCH prepared for the case of different minimum aggregation levels.

Similarly, when ECCE #(n+6), ECCE #(n+10), . . . , etc. are selected as a representative ECCE, this does not necessarily mean that an aggregation level of corresponding DCI is 2 but means that a minimum aggregation level of a corresponding (e)PDCCH set is 1 or 2. Accordingly, a PUCCH resource for an index that satisfies (ECCE index-n) modulo 4=2, such as ECCE #(n+6), ECCE #(n+6), . . . etc. may also be present between points ¼ to ½ of the PUCCH resource region like in the case of ECCE #(n+2).

FIGS. 17(b) to 17(c) illustrate an example of a rule for sequentially linking PUCCH resource indexes linked with ECCE resources having a corresponding index between points of ¼ to ½ of a PUCCH resource region.

Similarly, a maximum value is present among values to be considered as a minimum aggregation level, and the remaining PUCCH resource region after the above procedure is performed may be configured as a PUCCH resource region linked with a representative ECCE for DCI of a maximum aggregation level. FIG. 17(c) illustrates an embodiment in which a point corresponding to ⅛ of an entire PUCCH resource region is pre-ensured when a maximum value to be considered as a minimum aggregation level is 8.

That is, in short, for the case in which an ECCE index is n and a minimum aggregation level is k, PUCCH resources linked with ECCEs having an index that satisfies "(ECCE index-n) mod (2*k)=k" may be sequentially linked with between 1/k to 1/(2*k) of a PUCCH region (in ascending order or descending order).

In addition, when a largest value among minimum aggregation levels to which the present is applicable is M, PUCCH resources linked with ECCEs having an index that satisfies "(ECCE index-n) mod M=0" may be sequentially linked between points of 0 to 1/M of a PUCCH region (in ascending order) for the case in which a minimum aggregation level is M.

Figure 18:
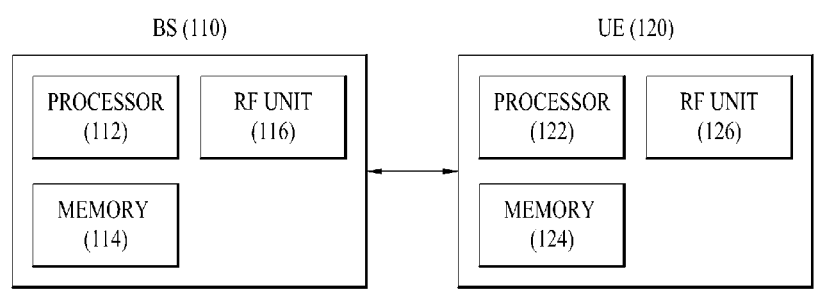
FIG. 18 illustrates a BS and a UE to which an embodiment of the present invention is applicable.

FIG. 18 illustrates a BS and a UE to which an embodiment of the present invention is applicable. When a wireless communication system includes a relay, communication on a backhaul link is performed between the BS and the relay, and communication in access link is performed between the relay and the UE. Thus, the BS or the UE illustrated in FIG. 18 may be replaced with a relay according to a current situation.

Referring to FIG. 18, a wireless communication system includes a BS 110 and a UE 120. The BS 110 includes a processor 112, a memory 114, and a radio frequency (RF) unit 116. The processor 112 may be configured to embody the procedures and/or methods proposed according to the present invention. The memory 114 is connected to the processor 112 and stores various information associated with an operation of the processor 112. The RF unit 116 is connected to the processor 112 and transmits and/or receives a radio signal. The UE 120 includes a processor 122, a memory 124, and an RF unit 126. The processor 122 may be configured to embody the procedures and/or methods proposed according to the present invention. The memory 124 is connected to the processor 122 and various information associated with an operation of the processor 122. The RF unit 126 is connected to the processor 122 and transmits and/or receives a radio signal. The BS 110 and/or the UE 120 may have a single antenna or multiple-antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example in which a method and device for transmitting an enhanced uplink control channel in a wireless communication system is applied to a 3GPP LTE system is described, the present invention is applicable to various wireless communication systems in addition to a $3^{rd}$ generation partnership project long term evolution (3GPP LTE) system.

The invention claimed is:

1. A method for transmitting an uplink control channel (physical uplink control channel; PUCCH) in a wireless communication system by a user equipment (UE), the method comprising:

receiving resources corresponding to an enhanced downlink control channel (enhanced physical downlink control channel; EPDCCH) comprising at least one enhanced control channel element (ECCE), from a base station (BS); and transmitting, to the BS, according to linkage information about the at least one enhanced control channel element (ECCE), resources corresponding to an uplink control channel (PUCCH), the uplink control channel (PUCCH) corresponding to a downlink data channel (physical data shared channel; PDSCH) scheduled by the enhanced downlink control channel (EPDCCH), wherein the linkage information includes information about an aggregation level set used to decode the enhanced downlink control channel (EPDCCH), and indicates a resource index of the uplink control channel corresponding to an index of the at least one enhanced control channel element (ECCE), according to a minimum value of an aggregation level in the aggregation level set for the enhanced downlink control channel (EPDCCH).

2. The method according to claim 1, further comprising receiving the linkage information from the BS.

3. The method according to claim 1, wherein the linkage information is pre-determined according to subframe type.

4. The method according to claim 1, wherein resource indexes of the uplink control channel (PUCCH) are continuously positioned.

5. The method according to claim 1, wherein a position of a resource index of the uplink control channel (PUCCH) is determined according to an index of the enhanced control channel element (ECCE) and the aggregation level.

6. A user equipment (UE) for transmitting an uplink control channel (physical uplink control channel; PUCCH) in a wireless communication system, the UE comprising:
a radio frequency (RF) unit; and
a processor, wherein the processor is configured to receive resources corresponding to an enhanced downlink control channel (enhanced physical downlink control channel; EPDCCH) comprising at least one enhanced control channel element (ECCE), from a base station (BS), and to transmit, to the BS, according to linkage information about the enhanced control channel element (ECCE), resources corresponding to an uplink control channel (PUCCH), the uplink control channel (PUCCH) corresponding to a downlink data channel (physical data shared channel; PDSCH) scheduled by the enhanced downlink control channel (EPDCCH) to the BS, according to linkage information about the enhanced control channel element (ECCE), wherein the linkage information includes information about an aggregation level set used to decode the enhanced downlink control channel (EPDCCH), and indicates a resource index of the uplink control channel corresponding to an index of the at least one enhanced control channel element (ECCE), according to a minimum value of an aggregation level in the aggregation level set for the enhanced downlink control channel (EPDCCH).

7. The UE according to claim 6, wherein the processor is further configured to receive the linkage information from the BS.

8. The UE according to claim 6, wherein the linkage information is pre-determined according to subframe type.

9. The UE according to claim 6, wherein resource indexes of the uplink control channel (PUCCH) are continuously positioned.

10. The UE according to claim 6, wherein a position of a resource index of the uplink control channel (PUCCH) is determined according to an index of the enhanced control channel element (ECCE) and the aggregation level.

* * * * *